US005560844A

United States Patent [19]

Boulos et al.

[11] Patent Number: 5,560,844

[45] Date of Patent: Oct. 1, 1996

[54] LIQUID FILM STABILIZED INDUCTION PLASMA TORCH

[75] Inventors: Maher I. Boulos; Jerzy W. Jurewicz, both of Sherbrooke, Canada

[73] Assignee: Université de Sherbrooke, Sherbrooke, Canada

[21] Appl. No.: 249,809

[22] Filed: May 26, 1994

[51] Int. Cl.$^{6}$ .................................................... B23K 10/00

[52] U.S. Cl. ................................ 219/121.59; 219/121.49; 219/121.51; 219/121.52; 315/111.51

[58] Field of Search ......................... 219/121.52, 121.51, 219/121.49, 121.48, 121.59, 121.36; 315/111.21, 111.51, 111.81; 313/231.21

[56] References Cited

U.S. PATENT DOCUMENTS

| | | | |
|---|---|---|---|
| 3,830,428 | 8/1974 | Dyos | 239/11 |
| 4,268,765 | 5/1981 | Hoover, Jr. | 310/11 |
| 4,642,440 | 2/1987 | Schnackel et al. | 219/121 |
| 5,026,464 | 6/1991 | Mizuno et al. | 204/164 |
| 5,187,344 | 2/1993 | Mizuno et al. | 219/121.5 |
| 5,200,595 | 4/1993 | Boulos et al. | 219/121.52 |

FOREIGN PATENT DOCUMENTS

| | | |
|---|---|---|
| 2141110 | 8/1971 | Germany . |
| 91/01077 | 7/1990 | WIPO . |
| 92/19086 | 10/1992 | WIPO . |

OTHER PUBLICATIONS

International Union of Pure and Applied Chemistry, Commission on High Temperatures and Refractories, High Temperature Technology, Proceedings of the Third International Symposium On High Temperature Technology held at Asilomar in Pacific Grove, California, U.S.A. 17–20 Sep., 1967. Analysis Of An RF Induction Plasma Torch With A Permeable Ceramic Wall, The Canadian Journal of Chemical Engineering, vol. 67, Dec., 1989.

"Experimental Plasma Studies Simulating a Gas–core nuclear Rocket" Charles E. Vogel AIAA Paper No. 70–691 Jun. 1970.

"Curved Permeable Wall Induction Torch Tests" Charles E. Vogel NASA CR–1764 report Mar. 1971.

"Analysis of an RF Induction Plasma Torch with a Permeable Ceramic Wall" Javad Mostaghimi et al. The Canadian Journal of Chemical Engineering, vol. 67, Dec. 1989.

*Primary Examiner*—Mark H. Paschall
*Attorney, Agent, or Firm*—Darby & Darby, P.C.

[57] ABSTRACT

A liquid film stabilized induction plasma torch comprises a cylindrical torch body made of cast ceramic or polymer-matrix composite, a coaxial cylindrical plasma confinement tube mounted inside the torch body, a gas distributor head secured to one end of the torch body to supply the confinement tube with gaseous substances, a cylindrical and coaxial induction coil embedded in the ceramic or polymer-matrix composite of the torch body, and a thin annular chamber separating the coaxial torch body and confinement tube. A high velocity cooling liquid flows through the thin annular chamber. The confinement tube is made of porous ceramic material through which cooling liquid from the annular chamber permeates. The permeating cooling liquid forms on the inner surface of the confinement tube a thin liquid film subjected to the high temperature of the plasma produced in the confinement tube. Cooling liquid from the film is vaporized and the resulting vapor forms the main body of the plasma gas required to operate the plasma torch. The permeable wall induction plasma torch arrangement can be used to generate a plasma of water vapor (steam) and of a wide range of vaporizable liquids. This can also be achieved by means of a hybrid combination of direct current and radio frequency induction plasma torches.

7 Claims, 3 Drawing Sheets

LIQUID FILM STABILIZED INDUCTION PLASMA TORCH

BACKGROUND OF THE INVENTION

1. Field of the Invention

The present invention is concerned with the field of induction plasma torches and relates more specifically to a plasma torch of which the performance is improved by permeating liquid through the plasma confinement tube. Vaporization of the permeating cooling liquid enables formation of plasmas in particular of water vapor (steam) but also of other vaporizable liquids.

2. Brief Description of the Prior Art

Induction plasma torches have been known since the early sixties. Their basic design has however been substantially improved over the past thirty years.

The basic concept of an induction plasma torch involves an induction coupling of the energy into the plasma using an appropriate induction coil. A gas distributor head is used to create a proper flow pattern into the region of the produced plasma, which is necessary to stabilize the plasma confined in a tube usually made of quartz, to maintain the plasma in the center of the coil and protect the plasma confinement tube against damage due to the high heat load from the plasma. At relatively high power levels (above 5–10 kW), additional cooling is required to protect the plasma confinement tube. This is usually achieved through deionized water flowing on the outer surface of the tube.

Numerous attempts have been made to improve the protection of the plasma confinement tube. These tentatives are concerned with the use of (a) a protective segmented metallic wall insert inside the plasma confinement tube (U.S. Pat. No. 4,431,901 (Hull) issued on Feb. 14, 1984), (b) porous ceramic, permeable to gas, to construct the plasma confinement tube (J. Mostaghimi, M. Dostie, and J. Jurewicz, "Analysis of an RF induction plasma torch with a permeable ceramic wall", Can. J. Chem. Eng., 67, 929–936 (1989)), (c) radiatively cooled ceramic plasma confinement tubes (P. S. C. Van der Plas and L. de Galan, "A radiatively cooled torch for ICP-AES using 1 liter per min of argon", Spectrochemica Acta, 39B, 1161–1169 (1984) and P. S. C. Van der Plas and L. de Galan, "An evaluation of ceramic materials for use in non-cooled low flow ICP torches", Spectrochemica Acta, 42B, 1205–1216 (1987)), and (d) a high velocity water-cooled ceramic confinement tube (U.S. Pat. No. 5,200,595 (Boulos et al.) issued on Apr. 6, 1993). These attempts each present their respective limitations and shortcomings.

The use of a segmented metallic wall insert to improve protection of the plasma confinement tube present the drawback of substantially reducing the overall energy efficiency of the plasma torch.

It has been found that a plasma confinement tube made of porous ceramic material permeable to gas offers only limited protection. It also requires a large flow rate of transpiration gas to be effective. This results in a substantial reduction of the specific enthalpy of the plasma gas at the exit of the torch.

Concerning the radiatively cooled confinement tubes, their ceramic materials must withstand the relatively high operating temperatures, exhibit an excellent thermal shock resistance and must not absorb the RF (Radio Frequency) field. Most ceramic materials fail to meet with one or more of these stringent requirements.

Although the use of a high velocity water flow established in a thin annular chamber (U.S. Pat. No. 5,200,595) constitutes a major advance for cooling the confinement tube, its efficiency is limited since the water is applied to the outer surface of the confinement tube only.

British patent N° 1,066,651 (Cleaver) dated Apr. 26, 1967, proposes the use of a plasma torch having a porous confinement tube to produce metal or metalloid oxides by the vapour phase reaction of metal or metalloid halides with oxygenating gas. A gas or vaporisable liquid is transpired through the confinement tube to prevent, during the process, part of the metal or metalloid oxide produced to be deposited on the inner wall of the confinement tube in the form of an encrustation which can be hard and difficult to dislodge. This patent mentions that the transpired gas or vaporisable liquid has the further useful effect of cooling the porous confinement tube through which it is transpired.

All of the above described prior art methods of cooling the confinement tube of an induction plasma torch are unsuitable for substantially reducing the amount of plasma gas required to operate the plasma torch. Also, they do not allow such a torch to operate with condensable vapours such as water vapour (steam) without resorting to use of high temperature coolants for the cooling of the plasma torch.

OBJECTS OF THE INVENTION

An object of the present invention is therefore to overcome the above discussed drawbacks of the prior art.

Another object of the subject invention is to improve cooling of the plasma confinement tube of a plasma torch.

A third object of the invention is to provide a plasma torch with a confinement tube made of porous ceramic material and to cool this plasma confinement tube by means of (a) a high velocity cooling liquid flowing into a thin annular chamber surrounding the outer surface of the confinement tube, and (b) controlled permeation of cooling liquid through the porous ceramic material of the confinement tube.

A fourth object of the present invention is to provide a plasma torch in which the amount of plasma gas required to operate the torch is considerably reduced by vaporizing cooling liquid permeating the confinement tube. The vaporized liquid is substituted at least in part to the plasma gas whereby the energy normally transferred to the confinement tube is reinjected in the plasma to thereby improve the energy efficiency of the plasma torch and reduce the plasma gas flow rate required for the operation of the torch.

A fifth object of the present invention is to provide a plasma torch having a confinement tube made of porous ceramic material through which cooling liquid permeates thus enabling the formation of plasmas of water vapour (steam) and other vaporizable liquids.

Yet another object of the present invention is to provide a plasma torch having a confinement tube made of porous ceramic material and an annular chamber surrounding that confinement tube and having a varying thickness to cause greater permeation of the cooling liquid where the heat flux generated by the plasma is greater.

SUMMARY OF THE INVENTION

More specifically, in accordance with the present invention, there is provided a method of supplying plasma gas required to produce plasma in a plasma torch comprising (a) a tubular torch body having an inner surface and an inner diameter, (b) a plasma confinement tube in .which the plasma is produced, the confinement tube being made of porous material and having an inner surface, an outer surface and an outer diameter, wherein the outer diameter of the confinement tube is smaller than the inner diameter of the torch body and the confinement tube is mounted within the tubular torch body to form an annular chamber between the inner surface of the tubular torch body and the outer surface of the confinement tube. This method comprises the steps of:

creating a flow of cooling liquid through the annular chamber for cooling the confinement tube in which plasma is produced;

permeating cooling liquid from the annular chamber through the porous material of the confinement tube to form a film of cooling liquid on the inner surface of the confinement tube;

vaporizing cooling liquid by applying heat from the plasma to the film on the inner surface of the confinement tube.

According to the method, the cooling liquid is selected to form, when vaporized, the plasma gas required to produce the plasma in the confinement tube. Therefore, the vaporized cooling liquid reduces substantially the amount of plasma gas normally supplied to the plasma torch to produce the plasma.

In accordance with a preferred embodiment, the cooling liquid flow creating step comprises:

producing in the annular chamber a flow of cooling liquid having a pressure that varies along the geometrical axis of the confinement tube; and permeating a quantity of cooling liquid through the porous material of the confinement tube which varies with the pressure of the cooling liquid along the axis.

The porous material of the confinement tube preferably comprises ceramic material, and the cooling liquid comprises water.

The present invention also relates to an induction plasma torch comprising:

a tubular torch body having an inner surface and an inner diameter;

a plasma confinement tube in which plasma is produced, this plasma confinement tube being made of a material permeable to a cooling liquid, and having a first end, a second end, an inner surface, an outer surface and an outer diameter, wherein the outer diameter of the confinement tube is smaller than the inner diameter of the torch body and the confinement tube is mounted within the tubular torch body to form an annular chamber between the inner surface of the tubular torch body and the outer surface of the confinement tube;

means for establishing a flow of cooling liquid through the annular chamber from one end of the confinement tube to the other end thereof for cooling this confinement tube in which plasma is produced, cooling liquid from the annular chamber permeating the material of the confinement tube to form a film of cooling liquid on the inner surface of the confinement tube and cooling liquid from this film being vaporized by heat produced by the plasma, the cooling liquid being selected to form, when vaporized, gas capable of producing plasma;

a gas distributor head mounted on the torch body at the first end of the plasma confinement tube for supplying at least one gaseous substance into the confinement tube, this gaseous substance flowing through the plasma confinement tube from the first end to the second end thereof; and an induction coil wound around the annular chamber and supplied with an electric current for inductively applying energy to (a) the gaseous substance flowing through the plasma confinement tube, and (b) the cooling liquid vaporized into that confinement tube in order to produce and sustain the plasma in the confinement tube;

wherein the annular chamber has a geometrical axis, and a thickness profile along that geometrical axis which changes the pressure of the cooling liquid along this axis in view of increasing permeation of the cooling liquid through the confinement tube and therefore the thickness of the liquid film at locations of the inner surface of the confinement tube where heat produced by the plasma is higher.

In accordance with preferred embodiments of the induction plasma torch:

the thickness profile comprises a first section of the annular chamber having a uniform thickness and a second section of the annular chamber having a thickness tapering toward the first section;

the second section of the annular chamber comprises the outer surface of the confinement tube being cylindrical and the inner surface of the tubular torch body being conical; and the induction plasma torch further comprises a plasma exit nozzle mounted at the second end of the plasma confinement tube, this plasma exit nozzle comprising annular conduit means for draining from the inner surface of the confinement tube any excess of cooling liquid of the film that has not been vaporized.

The objects, advantages and other features of the present invention will become more apparent upon reading of the following non restrictive description of preferred embodiments thereof, given as non limitative examples only with reference to the accompanying drawings.

DETAILED DESCRIPTION OF THE PREFERRED EMBODIMENT

Figure 1:
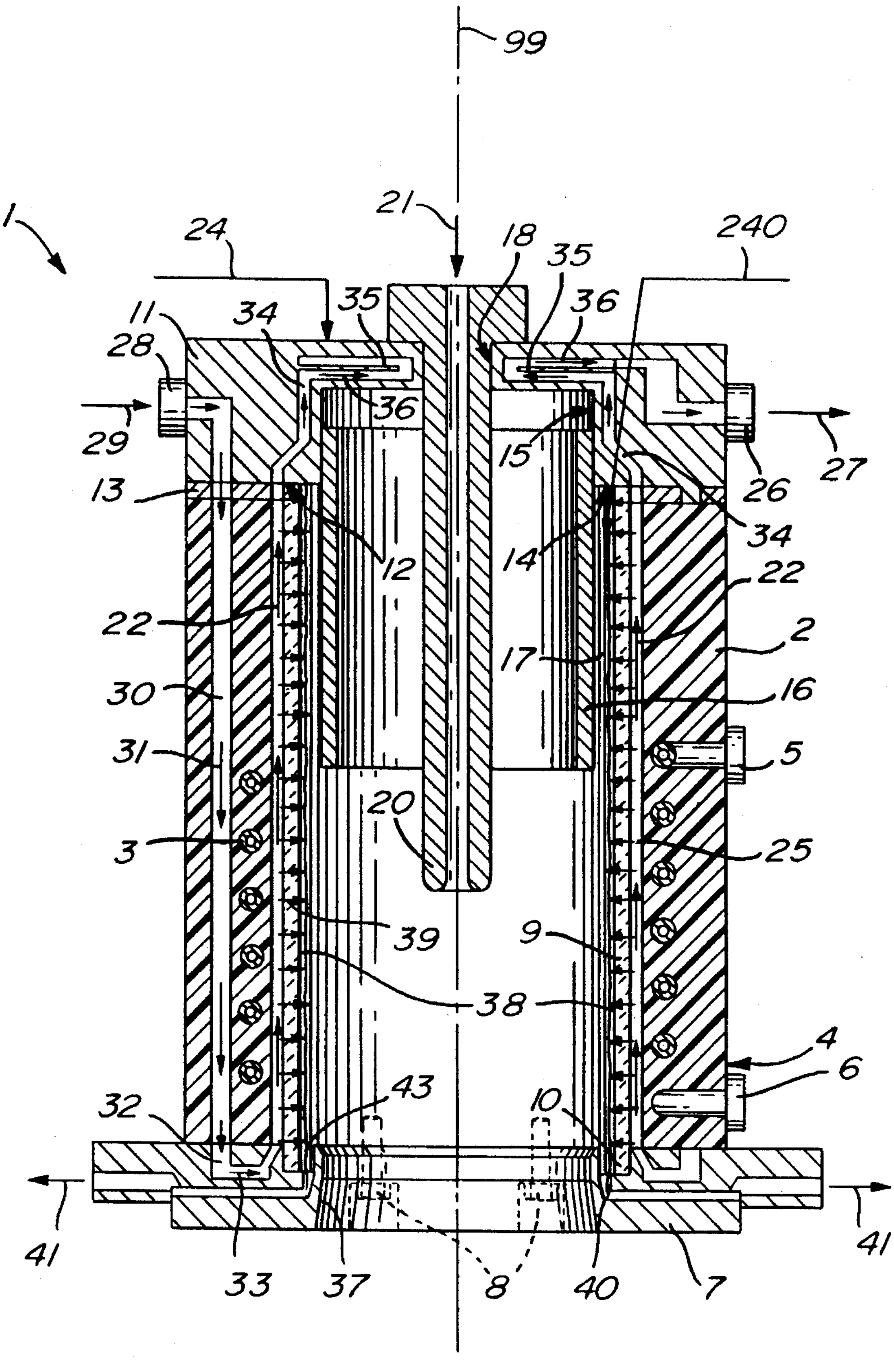
FIG. 1 is an elevational, cross sectional view of a first preferred embodiment of the liquid film stabilized induction plasma torch in accordance with the present invention, comprising a porous confinement tube surrounded by an annular chamber of uniform thickness in which a flow of cooling liquid is established.

In FIG. 1 of the drawings, the first preferred embodiment of the liquid film stabilized induction plasma torch in accordance with the present invention is generally identified by the reference 1.

The plasma torch 1 comprises a cylindrical torch body 2 made of a cast ceramic or composite polymer. An induction coil 3, made of water-cooled copper tube, is completely embedded in the torch body 2 whereby positional stability of this coil is ensured. The two ends of the induction coil 3 both extend to the outer surface 4 of the torch body 2 and are respectively connected to a pair of electric terminals 5 and 6 through which cooling water and a RF electric current is supplied to that coil 3. As can be seen, the torch body 2 and the induction coil 3 are cylindrical and coaxial about axis 99.

A plasma confinement tube 9, made of porous ceramic material is mounted inside the torch body 2, coaxially therewith.

A circular plasma exit nozzle 7 is fastened to the lower end of the torch body 2 by means of a plurality of bolts such as 8 of which each pair is separated by an arc of circle of given length. As illustrated in FIG. 1, the exit nozzle 7 is formed with an upper, inner right angle seat 10 to receive the lower end of the confinement tube 9 and thereby mount this confinement tube 9 coaxial with the torch body 2.

A gas distributor head 11 is fixedly secured to the upper end of the torch body 2 by means of a plurality of bolts (not shown), similar to the above mentioned bolts 8. A flat disk 13 is interposed between the torch body 2 and the gas distributor head 11; it is equipped with O-rings to seal the joint with the body 2 and head 11. The disk 13 has an inner diameter slightly larger than the outer diameter of the confinement tube 9 to form with the underside 14 of the head 11 a right angle Seat 12 to receive the upper end of the confinement tube 9 and thereby mount that tube 9 coaxial with the torch body 2.

The gas distributor head 11 also comprises an intermediate tube 16. A cavity is formed in the underside 14 of the head 11, which cavity defines a cylindrical wall 15 of which the diameter is dimensioned to receive the upper end of the intermediate tube 16. The tube 16 is shorter and smaller in diameter than the tube 9, and it is cylindrical and coaxial with the body 2, tube 9 and coil 3. A cylindrical cavity 17 is accordingly defined between the intermediate 16 and confinement 9 tubes.

The gas distributor head 11 is provided with a central opening 18 through which a tubular, central powder or gas injection probe 20 is introduced. The probe 20 is elongated and coaxial with the tubes 9 and 16, the coil 3 and body 2.

Powder and a carrier gas (arrow 21) are injected in the torch 1 through the probe 20. The powder transported by the carrier gas and injected through the probe 20 constitutes a material to be molten or vaporized by the plasma or material to be processed, as well known to those of ordinary skill in the art.

The gas distributor head 11 also comprises conventional conduit means (not shown) adequate to inject a central gas (arrow 24) inside the intermediate tube 16 and to cause a tangential flow of this gas. The gas distributor head 11 further comprises conventional conduit means (not shown) adequate to inject a sheath gas (arrow 240) within the cylindrical cavity 17 between the intermediate 16 and confinement 9 tubes and to cause a tangential flow of this gas.

It is believed to be within the skill of an expert in the art to select (a) the structure of the powder injection probe 20 and of the plasma gas conduit means (arrows 24 and 240), (b) the nature of the powder, carrier gas, central gas and sheath gas, and (c) the materials of which are made the exit nozzle 7, the gas distributor head 11 and the intermediate tube 16, and the disk 13, and accordingly these elements will not be further described in the present specification.

In operation, the inductively coupled plasma is generated by applying an RF electric current to the induction coil 3 to produce an RF magnetic field in the confinement tube 9. The applied field induces Eddy currents in the ionized gas and by means of Joule heating, a stable plasmoid is sustained. The operation of an induction plasma torch, including ignition of the plasma, is believed to be within the knowledge of one of ordinary skill in the art and does not need to be described in further detail in the present specification.

The induction coil 3 being completely embedded in the cast ceramic or composite polymer of the torch body 2, the spacing between the induction coil 3 and the plasma confinement tube 9 can be accurately controlled to improve the energy coupling efficiency between the coil 3 and the plasma.

As illustrated in FIG. 1, a thin annular chamber 25 of uniform thickness ($\approx$1 mm thick) is defined between the inner cylindrical surface of the torch body 2 and the outer cylindrical surface of the confinement tube 9. High velocity (at least 1 m/s) cooling liquid flows axially through the thin annular chamber 25 over the outer surface of the tube 9 (arrows such as 22) to cool this confinement tube 9 of which the inner surface is exposed to the high temperature of the plasma. The induction coil 3 being completely embedded in the cast ceramic or composite polymer of the torch body 2, the thickness of the annular chamber 25 can be accurately controlled, without any interference caused by the induction coil 3, which control is obtained by machining to low tolerance the inner surface of the torch body 2 and the outer surface of the plasma confinement tube 9.

As the confinement tube 9 is made of porous ceramic material, cooling liquid from the thin annular chamber 25 permeates through the tube 9 (arrows such as 39). As the thickness of the annular chamber 25 is uniform, the pressure of the cooling liquid along the axis 99 is also uniform and the quantity of cooling liquid permeating the porous confinement tube 9 is uniform along axis 99 and over the inner surface of tube 9. The cooling liquid permeating the porous ceramic material forms on the inner cylindrical surface of confinement tube 9, a thin film 38 of liquid, less than 1 mm thick and flowing downwardly toward the lower end of the torch 1. This thin film 38 will absorb heat from the plasma generated in the confinement tube 9 and at least a portion of the liquid of this film 38 vaporizes to form vapour. The cooling liquid is selected to produce vapour capable of feeding plasma. For example the cooling liquid is water if a water vapour (steam) plasma is to be generated. The use of a wide range of other cooling liquids such as alcohols and ketones can also be contemplated.

Vaporisation of liquid from the film 38 formed on the inner surface of the confinement tube 9 presents the following advantages:

The vaporized liquid considerably reduces the amount of sheath gas (see arrow 240) required for proper operation of the plasma torch. Although the vaporized liquid can completely replace the sheath gas, some central tangential gas flow (arrow 24) may still be required to stabilize the plasma discharge; however the amount of such central gas can be limited to a small fraction of the total mass of plasma gas. Therefore, the vaporized liquid forms the main body of the plasma gas necessary to operate the plasma torch 1;

The energy (heat) transferred to the liquid film 38 is partly returned to the plasma through the energy of the vaporized liquid to thereby increase the energy efficiency of the plasma torch;

The energy involved in vaporizing liquid from the thin film 38 is not transferred to the confinement tube 9 in the form of heat, whereby the confinement tube 9 is easier to cool.

The excess of cooling liquid, i.e. the portion of cooling liquid permeating the confinement tube 9 and which is not vaporized (see arrows 41), is drained through a narrow cylindrical gap 43 conducting to an annular outlet chamber 40. Of course, the flow of this excess of cooling liquid through the narrow cylindrical gap 43 and the annular chamber 40 cools the inner surface 37 of the exit nozzle 7, which is exposed to the heat produced by the plasma.

Figure 2:
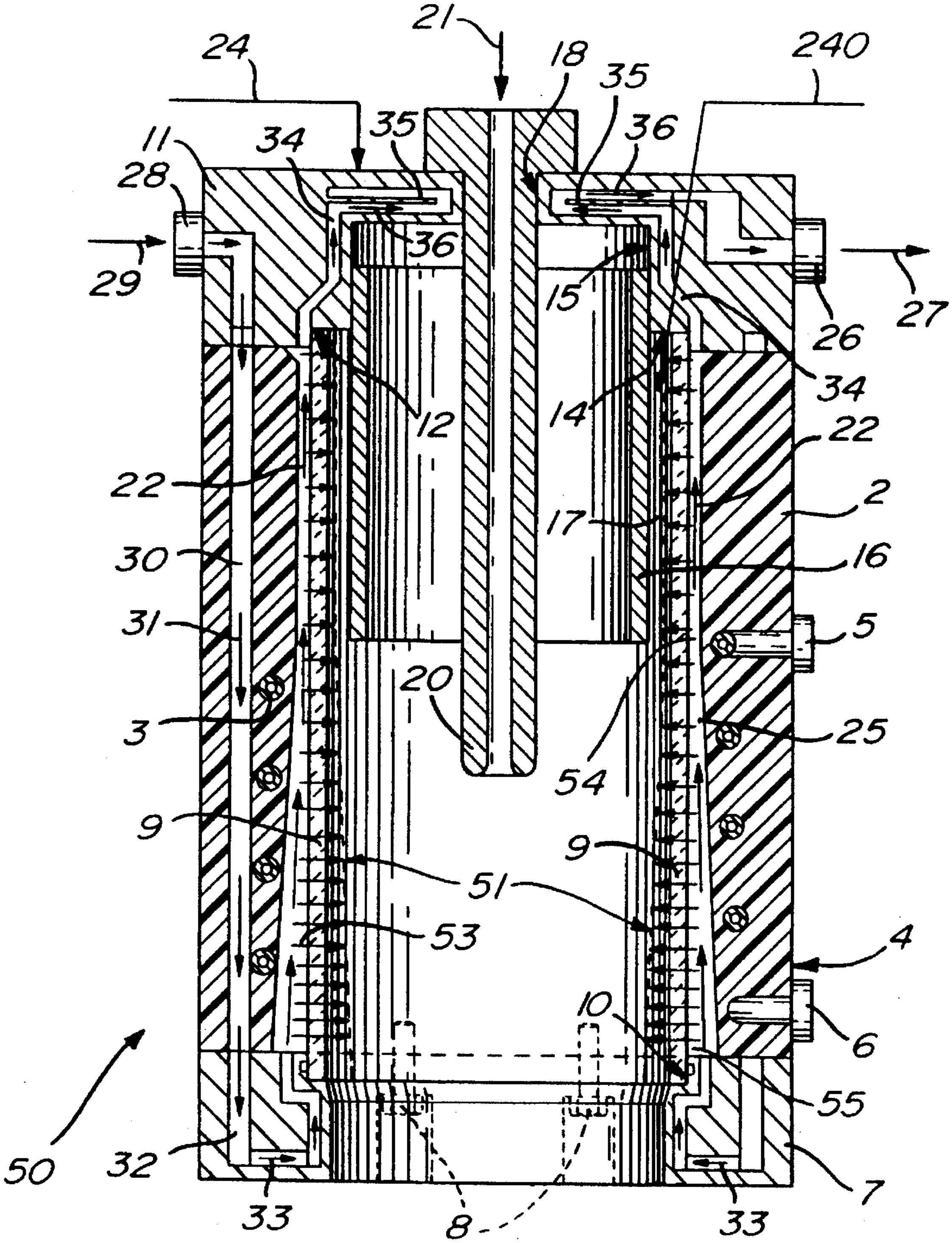
FIG. 2 is an elevational, cross sectional view of a second preferred embodiment of the liquid film stabilized induction plasma torch in accordance with the present invention, of which the thickness of the annular chamber varies along the axis of the plasma torch.

It should be pointed out that the narrow cylindrical gap 43 and the outlet chamber 40 are not essential to the operation of the plasma torch 1 (see the second embodiment 50 of FIG. 2). However, they are useful in applications where the presence of liquid droplets in the plasma flow should be avoided.

Returning to FIG. 1, the cooling liquid (arrow 29) is injected in the thin annular chamber 25 through an inlet 28, a conduit 30 made through the head 11, disk 13 and body 2 (arrows such as 31), and annular conduit means 32, generally U-shaped in cross section and structured to transfer the liquid from the conduit 30 to the lower end of the annular chamber 25.

The cooling liquid from the upper end of the thin annular chamber 25 is transferred to an outlet 26 (arrow 27) through two parallel conduits 34 formed in the gas distribution head 11 (arrows such as 36). A wall 35 is also formed in the conduits 34 to cause flowing of cooling liquid along the inner surface of the head 11 and thereby efficiently cool this inner surface.

The porous ceramic material of the plasma confinement tube 9 can be pure or composite ceramic materials based on sintered or reaction bonded silicon nitride, boron nitride, aluminum nitride, silica and alumina, or any combinations of them with varying additives and fillers. This ceramic material is characterized by a high thermal conductivity, a high electrical resistivity and a high thermal shock resistance.

As the ceramic body of the plasma confinement tube 9 presents a high thermal conductivity, the high velocity of the cooling liquid flowing in the thin annular chamber 25 and the flow of cooling liquid permeating the confinement tube 9 provide a high heat transfer coefficient suitable and required to properly cool the plasma confinement tube 9. Efficient cooling of the inner and outer surfaces of the plasma confinement tube 9 enables production of plasma at much higher power at lower gas flow rates than normally required in standard plasma torches comprising a confinement tube made of quartz. This causes in turn higher specific enthalpy levels of the gases at the exit of the plasma torch.

Different methods are available for controlling permeation of the cooling liquid through the confinement tube 9.

Of course, a first method is to select the porosity of the ceramic material constituting the confinement tube 9 to enable a given permeation of cooling liquid at a given pressure of this liquid.

Also, the pressure of the cooling liquid in the annular chamber 25 can be controlled since permeation varies with that pressure; an increase of pressure will increase permeation while a reduction of pressure will decrease permeation.

Furthermore, variation of the thickness profile of the annular chamber 25 along the axis 99 of the plasma torch 1 varies the pressure of the cooling liquid along that axis 99 to also vary permeation of the cooling liquid through the tube 9 along the plasma torch 1 (see the second preferred embodiment 50 of FIG. 2).

As will be apparent to those of ordinary skill in the art, the lower portion of the confinement tube 9 located from point 54 to point 55 (FIG. 2) is subjected to higher heat from the plasma flow than the upper portion of that confinement tube. To cool the lower portion of the tube 9 more efficiently, the thickness of the annular chamber 25 in this area is increased gradually from point 54 to point 55 (see FIG. 2). More specifically, between points 54 and 55, the outer surface of the confinement tube 9 is cylindrical and the inner surface of the tubular torch body 2 is conical. Of course, the pressure of the cooling liquid in the lower thicker portion of the annular chamber 25 is higher whereby more cooling liquid permeates through the lower portion of the confinement tube 9 (see arrows 53), undergoing higher heat from the plasma flow, to better cool the confinement tube lower portion and for vaporizing a greater amount of cooling liquid to thereby produce a greater amount of plasma vapour. This also enables control of the thickness of the film 51 along the axis 99 to reduce the quantity of non vaporized liquid on the inner surface of the confinement tube 9. Reference is made to FIG. 2 showing a greater thickness of the resulting liquid film 51 on the inner surface of the lower portion of the confinement tube 9.

Due to the greater thickness of the lower portion of the annular chamber 25, the coil 3 of the embodiment 50 of FIG. 2 is slightly conical. The preferred embodiment 50 of the plasma torch according to the invention (FIG. 2) is otherwise identical to the embodiment 1 of FIG. 1.

Figure 3:
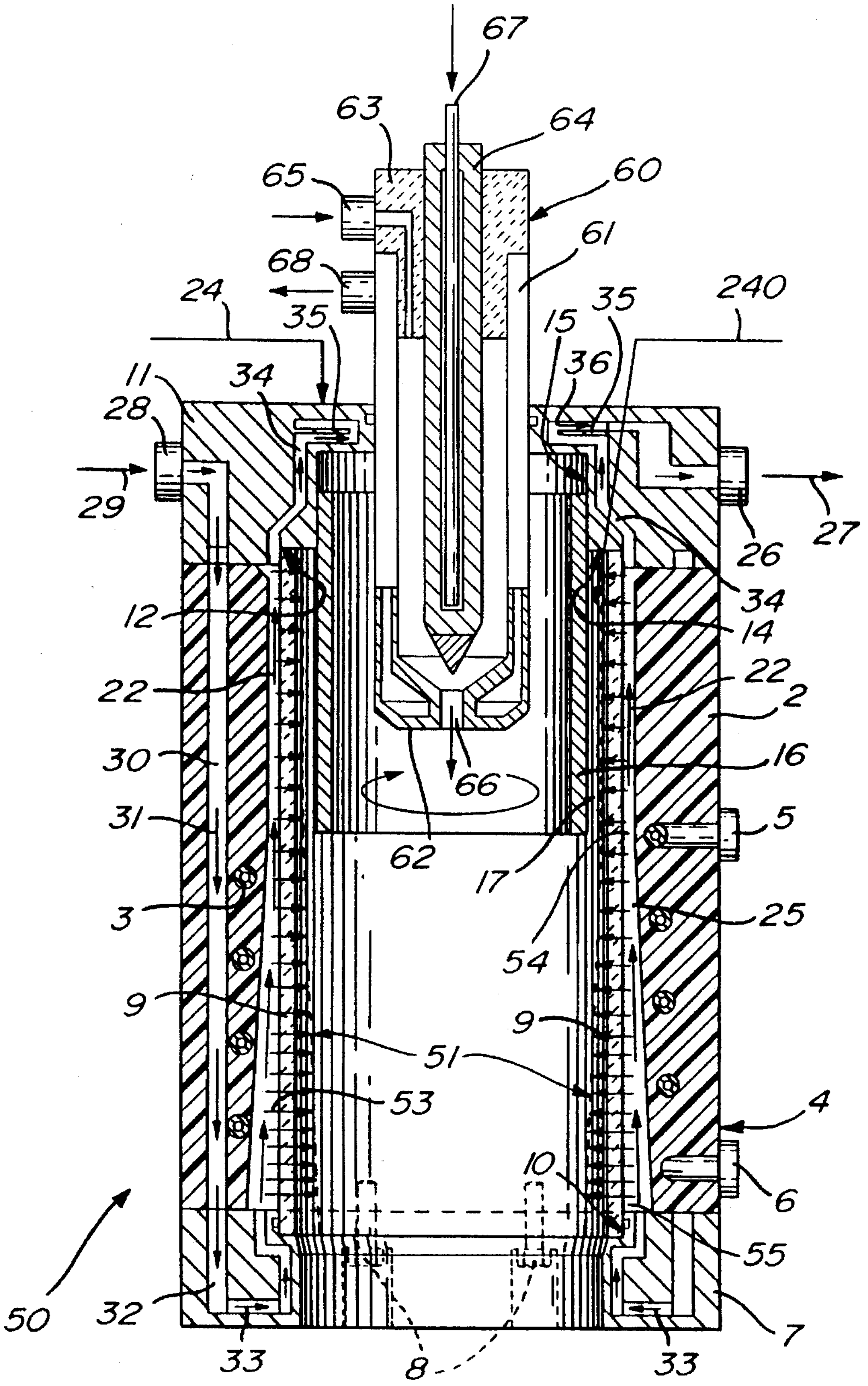
FIG. 3 is an elevational, cross sectional view of a hybrid combination of direct current and induction plasma torches in accordance with the present invention, in which the induction plasma torch comprises a porous confinement tube surrounded by an annular chamber having a thickness varying according to a given axial thickness profile, a flow of cooling liquid being established in that annular chamber.

As illustrated in FIG. 3 of the appended drawings, the concept of the present invention, i.e. the porous confinement tube through which cooling liquid permeates can be applied to an hybrid combination of direct current and RF induction plasma torches. The tubular central powder or gas injection probe 20 is then replaced by a direct current plasma torch 60 inserted through the gas distributor head 11 to extend centrally of the intermediate tube 16. As well known to those of ordinary skill in the art, the direct current plasma torch 60 comprises:

- a cylindrical torch body 61;
- a direct current torch anode 62 mounted to the lower end of the body 61;
- a head 63 mounted to the upper end of the cylindrical body 61;
- an axial direct current cathode 64 inserted through the head 63;
- an upper plasma gas inlet 65 in the head 63;
- an axial lower plasma outlet 66 in the anode 62 to discharge plasma in the intermediate tube 16;
- a cooling water inlet 67 in the cathode 64; and
- a cooling water outlet 68 in the cylindrical body 61.

Also, the direct current plasma torch 60 can be replaced by another RF induction plasma torch (not shown) to form an hybrid combination of induction plasma torches. Combinations of direct current and RF induction plasma torches are believed to be otherwise well known to those of ordinary skill in the art and accordingly will not be further described in the present disclosure.

Although the present invention has been described hereinabove by way of preferred embodiments thereof, these embodiments can be modified at will, within the scope of the appended claims, without departing from the spirit and nature of the subject invention.

What is claimed is:

1. An induction plasma torch comprising:

- a tubular torch body having an inner surface and an inner diameter;
- a plasma confinement tube in which plasma is produced, said plasma confinement tube being made of a material permeable to a cooling liquid, and having a first end, a second end, an inner surface and an outer diameter, wherein said outer diameter is smaller than said inner diameter and the confinement tube is mounted within the tubular torch body to form an annular chamber between the inner surface of the tubular torch body and the outer surface of the confinement tube;

a gas distributor head mounted on the torch body at said first end of the plasma confinement tube for supplying at least one gaseous substance into said confinement tube, wherein said at least one gaseous substance comprises a plasma-sustaining central gas and a plasma-sustaining sheath gas, and wherein said gas distributor head comprises (a) means for producing a central flow of said plasma-sustaining central gas in the plasma confinement tube from said first end to said second end thereof and (b) means for producing a flow of said plasma-sustaining sheath gas on the inner surface of the plasma confinement tube from said first end to said second end thereof;

means for establishing a flow of said cooling liquid through the annular chamber from one end of the confinement tube to the other end thereof for cooling said confinement tube in which plasma is produced, cooling liquid from said annular chamber permeating said material of the confinement tube to form a film of said cooling liquid on the inner surface of said confinement tube and cooling liquid from said film being vaporized by heat produced by the plasma, said cooling liquid being selected to form, when vaporized, gas capable of producing plasma; and an induction coil wound around said annular chamber and supplied with an electric current for inductively applying energy to (a) said at least one gaseous substance flowing through the plasma confinement tube and including said plasma-sustaining central gas and said plasma-sustaining sheath gas, and (b) the cooling liquid vaporized into said confinement tube in order to produce and sustain said plasma in the confinement tube;

wherein said annular chamber has a geometrical axis, and a thickness profile along said geometrical axis which changes the pressure of said cooling liquid along said axis in view of increasing permeation of said cooling liquid through the confinement tube and therefore the thickness of said liquid film at locations of the inner surface of the confinement tube where heat produced by the plasma is higher.

2. An induction plasma torch as defined in claim 1, in which said thickness profile comprises a first section of said annular chamber having a uniform thickness and a second section of said annular chamber having a thickness tapering toward said first section.

3. An induction plasma torch as defined in claim 2, wherein said second section of the annular chamber comprises said outer surface of the confinement tube being cylindrical and the inner surface of the tubular torch body being conical.

4. An induction plasma torch as defined in claim 1, wherein the cooling liquid comprises water.

5. An induction plasma torch as defined in claim 1, further comprising a plasma exit nozzle mounted at said second end of the plasma confinement tube, wherein said plasma exit nozzle comprises annular conduit means for draining from the inner surface of the confinement tube any excess of cooling liquid of said film that has not been vaporized.

6. An induction plasma torch as defined in claim 1, in which said induction plasma torch is combined with another induction plasma torch to form an hybrid combination of induction plasma torches.

7. An induction plasma torch as defined in claim 1, in which said induction plasma torch is combined with a direct current plasma torch to form an hybrid combination of direct current and induction plasma torches.

* * * * *